United States Patent [19]

Coran et al.

[11] 4,183,876

[45] Jan. 15, 1980

[54] THERMOPLASTIC COMPOSITIONS OF POLYALKENAMER RUBBER AND POLYOLEFIN RESIN

[75] Inventors: Aubert Y. Coran; Raman Patel, both of Akron, Ohio

[73] Assignee: Monsanto Company, St Louis, Mo.

[21] Appl. No.: 963,861

[22] Filed: Nov. 27, 1978

[51] Int. Cl.² ........................ C08L 23/06; C08L 23/12
[52] U.S. Cl. ..................................... 525/232; 525/197
[58] Field of Search ............... 260/897 A, 897 R, 848, 260/896

[56] References Cited

U.S. PATENT DOCUMENTS

| | | | |
|---|---|---|---|
| 3,037,954 | 6/1962 | Gessler et al. | 260/29.8 |
| 3,458,489 | 7/1969 | Natta et al. | 526/308 |
| 3,523,145 | 8/1970 | Manasesi et al. | 260/886 |
| 3,732,338 | 5/1973 | Theisen et al. | 260/897 A |
| 3,758,643 | 9/1973 | Fisher | 260/897 A |
| 4,104,210 | 8/1978 | Coran et al. | 260/4 R |
| 4,130,535 | 12/1978 | Coran et al. | 260/33.6 AQ |

*Primary Examiner*—Carman J. Seccuro
*Attorney, Agent, or Firm*—Larry R. Swaney

[57] ABSTRACT

Thermoplastic compositions are described comprising blends of cross-linked polyalkenamer rubber and crystalline thermoplastic polyolefin resin.

21 Claims, No Drawings

THERMOPLASTIC COMPOSITIONS OF POLYALKENAMER RUBBER AND POLYOLEFIN RESIN

This invention relates to thermoplastic compositions and, more particularly, to thermoplastic compositions comprising blends of polyolefin resin and cross-linked polyalkenamer rubber.

BACKGROUND OF THE INVENTION

Thermoplastics are compositions which can be molded or otherwise shaped and reprocessed at temperatures above their melting or softening point. Thermoplastic elastomers (elastoplastics) are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming and, in addition, many thermoplastics can be thermally welded.

SUMMARY OF THE INVENTION

It has been discovered that compositions comprising blends of thermoplastic crystalline polyolefin resin and cross-linked polyalkenamer rubber exhibit useful properties which properties vary depending on the proportion of crystalline polyolefin resin and cross-linked polyalkenamer rubber in the compositions. Compositions comprising 15–95 parts by weight crystalline polyolefin resin and correspondingly 85–5 parts by weight cross-linked polyalkenamer rubber per 100 total parts by weight of resin and rubber are moldable thermoplastic compositions exhibiting improved strength and greater toughness and impact resistance than similar compositions containing substantially uncross-linked rubber. Compositions comprising more than 75 parts by weight of crystalline polyolefin resin are thermoplastic compositions exhibiting improved impact resistance. Compositions comprising less than 75 parts by weight of crystalline polyolefin resin are elastroplastic, i.e., they exhibit elastomeric properties yet are processable as a thermoplastic. However, when the amount of polyalkenamer rubber exceeds 75 parts by weight per 100 total parts by weight resin and rubber, thermoplasticity is reduced or lost completely if the polyalkenamer rubber is fully cross-linked. Thus, when the amount of polyalkenamer rubber is greater than 75 parts by weight (per 100 rubber and resin combined), an amount of curative is used to only partially cure the rubber. Plasticizer may be used in amounts up to 200 parts by weight, preferably, 100 parts by weight, more preferably 60 parts by weight per 100 parts by weight of rubber.

A thermoplastic composition of the invention comprises a blend of thermoplastic crystalline polyolefin resin and polyalkenamer rubber cross-linked to the extent that no more than 50 percent, preferably no more than 20 percent and more preferably, no more than 10 percent of the rubber is extractable in boiling xylene. Improved balance of properties including elastoplasticity are exhibited by blends containing about 25 to about 75 parts by weight thermoplastic crystalline polyolefin resin and about 75 to about 25 parts by weight of cross-linked polyalkenamer rubber per 100 total parts by weight of polyolefin resin and polyalkenamer rubber. Preferred elastoplastic compositions contain about 60 to about 30 parts by weight of polyolefin resin and 40 to about 70 parts by weight of polyalkenamer rubber per 100 parts by weight of polyolefin resin and polyalkenamer rubber combined.

More preferred elastoplastic compositions in accordance with this invention are compositions comprising blends of thermoplastic crystalline polyolefin resin and polyalkenamer rubber cross-linked to the extent that no more than 15 percent, and more preferably no more than 10 percent of the rubber is extractable in boiling xylene, which compositions are processable as thermoplastics and are elastomeric. Soft rubbery compositions of the invention exhibiting excellent tension set values comprise blends in which the amount of polyalkenamer rubber exceeds the amount of polyolefin resin, particularly blends of (a) about 25–50 parts by weight of thermoplastic polyolefin resin and (b) about 75–50 parts by weight of polyalkenamer rubber per 100 total parts weight of polyolefin resin and polyalkenamer rubber. The elastoplastic compositions are elastomeric; yet they are processable as thermoplastics even though the rubber is highly cross-linked even to a point where it is 80% or 90% or more insoluble in boiling xylene. Further, they retain thermoplasticity even when the polyalkenamer rubber is cross-linked to the extent that the rubber is essentially completely insoluble. The indicated relative proportions of polyolefin resin and polyalkenamer rubber are necessary to provide sufficient rubber to give elastomeric compositions and to provide sufficient polyolefin resin to give thermoplasticity. When the amount of cross-linked polyalkenamer rubber exceeds about 85 parts by weight per 100 parts total weight of polyolefin resin and rubber, there is insufficient polyolefin resin present to provide themoplasticity. When the quantity of cross-linked polyalkenamer rubber, in the absence of plasticizer, falls below about 75 parts by weight per 100 parts weight of polyolefin resin and rubber combined, or when the quantity of polyolefin resin exceeds 75 weight percent of the composition, hard, rigid compositions are obtained. Blends of the invention are envisaged as comprising microsized particles of cross-linked polyalkenamer rubber dispersed throughout a continuous polyolefin resin matrix. Especially preferred compositions of the invention comprise dispersed, cross-linked polyalkenamer rubber particles of 50 microns number average or less, preferably below 10 microns number average and more preferably below 2 microns number average.

The thermoplastic elastomers of the invention are rubbery compositions in which the rubber portion of the blend is cross-linked to the extent that the rubber has a gel content of 50 percent or more. The properties of the compositions can be improved by further cross-linking the rubber until said rubber has a gel content of 80 percent or more. However, in this connection, essentially complete gelation of say 90 percent or more is not always a necessary criterion of a fully cured product because of differences in molecular weight, molecular weight distribution and other variables which influence the gel determination. An effect of curing the composition is the very substantial improvements in mechanical properties. These improvements directly relate to practical uses. Surprisingly, the high strength elastomeric compositions are still processable as thermoplastics. This is in contrast to thermoset elastomers.

Thermoplastic compositions of the invention are preferably prepared by blending a mixture of polyalkenamer rubber, polyolefin resin and curatives in amounts sufficient to cure the rubber, then masticating the blend at a temperature sufficient to effect cross-link formation, using conventional masticating equipment, for example, Banbury mixer, Brabender mixer, or mixing extruders. The polyolefin resin and polyalkenamer rubber are mixed at a temperature sufficient to melt the polyolefin resin. After the polyolefin resin and polyalkenamer rubber are intimately mixed, curative is added. Heating and masticating at vulcanization temperatures are generally adequate to complete the cross-link formation in a few minutes or less, but if shorter times are desired, high temperatures may be used. A suitable range of temperatures for cross-link formation is from about the melting temperature of the polyolefin resin to the decomposition temperature of the polyalkenamer rubber wich range commonly is from about 110° C. to 250° C. with the maximum temperature varying somewhat depending on the type of rubber, the presence of antidegradants and the mixing time. Typically, the range is from about 130° C. to 220° C. A preferred range of temperatures is from about 140° C. to about 210° C. Blends are treated with curatives in amounts and under time and temperature conditions known to give cured products. This can be determined from studies of static cures of the rubber in molds, in the absence of polyolefin resin. Thermosets are avoided in the compositions of the invention by simultaneously masticating and curing the blends. To obtain thermoplastic compositions, it is important that mixing continues without interruption until cross-linking occurs. If appreciable cross-linking is allowed after mixing has stopped, a thermoset unprocessable composition may be obtained. A few simple experiments within the skill of the art utilizing available rubbers and curative systems will suffice to determine their applicability for the preparation of the improved products of this invention.

Methods other than the dynamic vulcanization of rubber/polyolefin resin blends can be utilized to prepare compositions of the invention. For example, the polyalkenamer rubber can be fully vulcanized in the absence of the polyolefin resin, powdered, and mixed with the polyolefin resin at a temperature above the melting or softening point of the polyolefin resin. Provided that the cross-linked polyalkenamer rubber particles are small, well dispersed and in an appropriate concentration, compositions within the invention are easily obtained by blending cross-linked polyalkenamer rubber and polyolefin resin. Accordingly, the term "blend" herein means a mixture comprising well dispersed small particles of cross-linked rubber. A mixture which contains poorly dispersed or too large rubber particles can be comminuted by cold milling (to reduce particle size to below about 50 microns number average), preferably below 10 micron number average and more preferably to below 2 micron number average. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The compositions of the invention are all processable in an internal mixer, to products which, upon transferring at temperatures above the softening or crystallizing points of the polyolefin resin, to the rotating rolls of a rubber mill, form continuous sheets. The sheets are reprocessable in the internal mixer, after reaching temperatures above the softening or melting points of the polyolefin resin. The material is again transformed to the plastic state (molten state of the polyolefin resin) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles be formed therefrom by extrusion, injection molding or calendering.

An improved thermoplastic composition is produced by cross-linking the rubber of a blend to the extent that the composition contains no more than about 50 percent by weight of the polyalkenamer rubber extractable in boiling xylene and preferably, to the extent that the composition contains less than 20 percent by weight extractable and more preferably, less than 10 percent by weight extractable. In general, the less extractables the better are the properties, however, respectable properties are obtained with high extractables, but for applications involving contact with organic solvents more preferably compositions comprise low quantities of extractable rubber. The compositions are extracted with boiling xylene to determine the extent of cure of the rubber (cured rubber being insoluble in boiling xylene). Thin film (about 0.05 mm thick) specimens are placed in boiling xylene. After about 30 minutes, the film is usually disintegrated. The xylene suspension is then filtered through a glass fiber filter of 0.3 micron pore size. The curatives are regarded as being part of the cured rubber. The residue on the filter paper is then dried at 150° C. to constant weight. The amount of polyalkenamer rubber extractable is calculated from the initial and final weights and by making suitable corrections based upon knowledge of the composition. Thus, the weight of soluble components, other than the rubber, such as extender oils, plasticizers and polyolefin resin soluble in the solvent are subtracted from the initial sample weight. Any insoluble pigments, fillers, etc., including insoluble polyolefin resin, are subtracted from both the initial and final weights.

It should not be assumed that the curative does not react with the polyolefin resin or that there is no reaction between the polyolefin resin and rubber. There may be highly significant reactions involved but of limited extent. However, the fact that a large proportion of the polyolefin resin can be dissolved by extraction with a solvent for the polyolefin resin such as boiling xylene indicates that no extensive cross-linking of the polyolefin resin has occurred.

Rubber satisfactory for the practice of the invention comprise essentially random noncrystalline, rubbery polymer of cycloalkene which rubber is commonly called and herein and in the claims shall be referred to as "polyalkenamer rubber." Polyalkenamer rubbers may be prepared by ring opening polymerization of one or more cycloalkenes in the presence of organometallic catalysis (U.S. Pat. No. 3,492,245). Polymers of cycloalkenes of 5–12 ring carbon atoms are satisfactory. Examples of suitable polyalkenamer rubbers are polypentenamer rubber, polyheptenamer rubber, polyoctenamer rubber, polydecenamer rubber and polydodecenamer rubber. The polyalkenamer rubber preferably contains from 50 to 99 percent of its double bonds in the trans-configuration. More preferred polyalkenamer rubber has about 60% to about 99% of the double bonds in the trans-configuration. For further details concerning polyalkenamer rubber, see *Rubber Chem. & Tech., Vol.* 47, page 511–596, 1974, which reference is incorporated herein by reference.

Any curing system suitable for curing the rubber may be used in the practice of this invention. Satisfactory curing systems are based on sulfur-, peroxide-, azide-, maleimide- or resin-vulcanization agents, ordinarily, used in conjunction with a vulcanization accelerator. Examples of satisfactory curing system components are zinc oxide, sulfur, organic peroxide, magnesium oxide, benzothiazole sulfenamide accelerator, benzothiazyl disulfide, phenolic curing resin, m-phenylene bis-maleimide, thiuram disulfide and dipentamethylene-thiuram hexasulfide. Efficient or semi-efficient sulfur curing systems comprising high accelerator to sulfur ratios are especially preferred. Sufficient quantities of curatives are used to cross-link the rubber to the extent necessary to achieve the desired extent of cure. High energy radiation is also utilizable as the curative means. Large amounts of peroxide should be avoided with branched polyolefin resins (e.g. polypropylene) and coagents should be used.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resins (or blends thereof), and preferably polyethylene or polypropylene, may be advantageously used in the practice of the invention.

One aspect of the invention comprises adding a rubber plasticizer to the blend. The addition of plasticizer extends the range of proportions of polyolefin resin to rubber in the composition while still retaining elastoplasticity. Generally, the quantity of plasticizer when present may be as high as 50 weight percent of the total composition. Any rubber plasticizer may be used but aromatic, naphthenic or paraffinic processing oil is preferred.

The properties of the thermoplastic compositions of this invention may be modified, either before or after vulcanization, by addition of ingredients which are conventional in the compounding of polyalkenamer rubber, polyolefin resin and blends thereof. Examples of such ingredients include carbon black, silica, titanium dioxide, magnesia, colored pigments, clay, silanes, titanates or other coupling agents, stabilizers, antidegradants, processing aids, adhesives, tackifiers, rubber plasticizers, wax, discontinuous fibers such as wood cellulose or glass fibers, etc., and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the polyolefin resin. Carbon black improves the tensile strength and rubber plasticizer can improve the resistance to oil swell, heat stability, hysteresis, cost and permanent set of the elastoplastic compositions. Plasticizers can also improve processability. For suitable plasticizers, refer to Rubber World Blue Book, supra, pages 145–190. The quantity of plasticizer added depends upon the properties desired, with the upper limit depending upon the compatibility of the particular plasticizer and blend ingredients which limit is exceeded when excessive exuding of plasticizer occurs. Typically, up to 50 parts by weight plasticizer are added per 100 parts by weight of rubber and polyolefin resin. Commonly, up to 60 parts by weight of plasticizer are added per 100 parts by weight of polyalkenamer rubber in the blend with quantities of about 20–50 parts by weight of plasticizer per 100 parts by weight of rubber being preferred. Typical additions of particulate fillers or reinforcement fillers such as carbon black comprise about 20–150 parts by weight of carbon black per 100 parts by weight of rubber and usually about 25–100 parts by weight carbon black per 100 parts total weight of rubber and plasticizer. The amount of carbon black which can be used depends, at least in part, upon the type of black and the amount of plasticizer to be used. The amount of plasticizer depends, at least in part, upon the type of rubber.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics, in particular, polyolefin resin. The compositions of the invention are blended with thermoplastics using conventional mixing equipment. The properties of the blend depend upon the proportions. Generally, the amount is such that the blend contains sufficient cross-linked rubber to obtain the desired effect.

Tensile properties of the compositions are determined by ASTM procedure D-1708-66. Specimens are pulled with an Instron tester at one inch per minute up to 30% elongation and then 10 inches per minute to failure. The term "elastomeric" as used herein and the claims means a composition which possesses the property of forcibly retracting within ten minutes to less than 160% of its original length after being stretched at room temperature to twice its length and held for ten minutes before release. Especially preferred compositions of the invention are rubbery compositions having tension set values of about 50% or less which compositions approximate the definition for rubber as defined by ASTM Standards, V. 28, page 756 D1566). More preferred compositions are rubbery compositions having a Shore D hardness of 50 or below or a 100% modulus of 12 MPa (megapascals) or less or a Young's modulus below 125 MPa.

DESCRIPTION OF PREFERRED EMBODIMENTS

A typical procedure for the preparation of compositions of the invention comprises mixing in the indicated proportions polyalkenamer rubber and polyolefin resin in a Brabender mixer with an oil bath temperature of 190° C. for a time sufficient, usually between 2–6 minutes, to melt the polyolefin resin and to form a blend. The mixing temperature will be understood to be the temperature of the oil bath with the realization that the actual temperature of the mixture may vary. Curatives are added to cross-link the rubber, and mixing is continued until a maximum Brabender consistency is reached, usually between 1–5 minutes, and for an additional one or two minutes thereafter. The order of mixing can vary but the ingredients should be added and mixed before substantial vulcanization occurs. The vulcanized but thermoplastic composition is removed, pressed into a sheet or sheeted on a mill, returned to the Brabender and mixed at the same temperature for two minutes. The material is again sheeted and then compression molded at 220° C. and cooled below 100° C. under pressure before removal from the mold. Properties of the molded sheet are measured and recorded. The aforesaid procedure is followed below unless stated otherwise.

Polyolefin resins used to illustrate the invention are properties of the compositions are shown in Table 1. The data show that cross-linking the rubber increases tensile strength of the blend. The data further show that cross-linking the rubber decreases ultimate elongation when the rubber is the minor component. The tension set data show that when the blends contain about 25 parts by wt. or more cross-linked rubber per 100 total parts by wt. of rubber and polyolefin resin, elastomeric compositions are obtained. All the compositions are processable as thermoplastics but in samples 8B and 9B containing 80 parts or more rubber per 100 total parts rubber and polypropylene reduced quantities of cross-linking agent must be used to maintain thermoplasticity. The thermoplasticity of the other compositions containing highly cured rubber is retained, it is believed, due to the cured rubber being in the form of dispersed small particles.

Table 1

| Sample | Polypentenamer rubber, pbw | Polypropylene pbw | TS, MPa | M100, Mpa | E, Mpa | UE, % | Tension set, % | Hardness Shore D | Soluble Rubber, Wt. % of Blend | Soluble Rubber, Wt. % of Rubber |
|---|---|---|---|---|---|---|---|---|---|---|
| 1A | 10 | 90 | 17.4 | 17.2 | 521 | 400 | 75 | 65 | 9.4 | 94.2 |
| 1B | 10 | 90 | 20.2 | 19.0 | 392 | 690 | 75 | 66 | 1.2 | 11.8 |
| 2A | 20 | 80 | 15.7 | 15.4 | 413 | 410 | 70 | 60 | 19.3 | 96.3 |
| 2B | 20 | 80 | 21.4 | 17.7 | 354 | 600 | 63 | 64 | 3.0 | 15.2 |
| 3A | 30 | 70 | 15.8 | 13.5 | 283 | 640 | 66 | 57 | 29.2 | 97.3 |
| 3B | 30 | 70 | 21.0 | 16.5 | 210 | 500 | 50 | 60 | 4.5 | 15.5 |
| 4A | 40 | 60 | 14.3 | 10.7 | 218 | 630 | 63 | 50 | 39.0 | 97.6 |
| 4B | 40 | 60 | 16.1 | 14.6 | 141 | 320 | 40 | 55 | 5.2 | 13.6 |
| 5A | 50 | 50 | 10.1 | 8.2 | 176 | 470 | 62 | 49 | 48.8 | 97.6 |
| 5B | 50 | 50 | 15.8 | 10.3 | 115 | 400 | 30 | 49 | 7.2 | 15.2 |
| 6A | 60 | 40 | 7.22 | 5.33 | 70 | 480 | 60 | 38 | 58.3 | 97.2 |
| 6B | 60 | 40 | 15.1 | 11.7 | 88 | 290 | 26 | 46 | 7.6 | 13.6 |
| 6C | 60 | 40 | 11.4 | 7.8 | 63 | 280 | 23 | 40 | 12.6 | 22.4 |
| 6D | 60 | 40 | 10.8 | 7.8 | 65 | 290 | 30 | 40 | 21.6 | 37.9 |
| 6E | 60 | 40 | 9.1 | 6.8 | 55 | 320 | 40 | 37 | 37.5 | 65.2 |
| 7A | 70 | 30 | 4.34 | 2.74 | 19 | 510 | 58 | 25 | 67.7 | 96.7 |
| 7B | 70 | 30 | 10.0 | 5.76 | 21 | 250 | 10 | 35 | 8.1 | 12.6 |
| 8A | 80 | 20 | 1.72 | 1.07 | 12.3 | 770 | 50 | 18 | 77.6 | 96.9 |
| 8B | 80 | 20 | 5.66 | 3.36 | 6.5 | 210 | 10 | 20 | 23.4 | 31.3 |
| 9A | 90 | 10 | 0.92 | 0.85 | — | >1000 | 52 | — | 87.1 | 96.7 |
| 9B | 90 | 10 | 2.57 | 1.31 | 2 | 310 | 10 | 15 | 39.9 | 47.2 | low flow, general purpose polypropylene, specific gravity 0.902, 11% yield elongation and polyethylene, ASTM D1248-72, type IV, melt index 0.6 and density 0.960 g/cm$^3$.

Uncured polyalkenamer rubber used to illustrate the invention is purchased from Bayer AG in the form of slabs under the tradename Polypentenamer TPR 3-80 elastomer (measured ML-4 at 100° C. is 42).

The effect of cross-linking the polypentenamer rubber and the effect of the relative proportion of polyolefin resin and polypentenamer rubber are shown in Table 1. The amounts are in parts by weight. Samples designated A are without curative; Samples designated B contain curative. In all stocks the curative comprises of 5 parts zinc oxide and 1 part stearic acid. Stocks 1B-7B contain 5 parts Santocure ® accelerator, N-cyclohexyl-2-benzothiazolesulfenamide, and 1.5 parts sulfur per 100 parts by weight of polypentenamer rubber. Stock 6C contains 4 parts Santocure ® accelerator and 1 prt sulfur. Stocks 6D and 8B contain 2 parts Santocure ® accelerator and 0.5 parts sulfur. Stocks 6E and 9B contain 1 part Santocure ® accelerator and 0.25 parts sulfur. The blends are prepared by the typical procedure using a Brabender mixing speed of 50–60 rpm. The Compositions of the invention cross-linked with different curatives and compositions containing polyethylene are illustrated in Table 2. Samples 1–5 contain 60 parts by weight polypentenamer rubber and 40 parts by weight polypropylene. Samples 6–8 contain 60 parts by weight polypentenamer rubber and 40 parts by weight polyethylene. Stocks 1 and 6 contain no curative. Stock 2 illustrates compositions in which the rubber is cross-linked with a meleimide curative. Stocks 3 and 7 illustrate compositions in which the rubber is cross-linked with an efficient sulfur curative system (high accelerator-low sulfur). Stocks 4, 5 and 9 illustrate compositions in which the rubber is cross-linked with a phenolic resin curative. The blends are prepared by the typical procedure as described above. HVA-2 is m-phenylene bis-maleimide. Santocure ® accelerator is N-cyclohexyl-2-benzothiazolesulfenamide. SP-1045 is 2,6-dimethylol-4-octyl phenol. SP-1056 is a brominated methylol phenolic curing resin. The properties of the compositions are shown in Table 2. The data show that cross-linking the rubber increases tensile strength and that the compositions containing cross-linked rubber are elastomeric. The data show also that compositions containing phenolic curative exhibit higher tensile strengths.

Table 2

| Stocks | 1 | 2 | 3 | 4 | 5 | 6 | 7 | 8 |
|---|---|---|---|---|---|---|---|---|
| Polypentenamer rubber | 60 | → | → | → | → | → | → | → |

Table 2-continued

| Stocks | 1 | 2 | 3 | 4 | 5 | 6 | 7 | 8 |
|---|---|---|---|---|---|---|---|---|
| Polypropylene | 40 | 40 | 40 | 40 | 40 | — | — | — |
| Polyethylene | — | — | — | — | — | 40 | 40 | 40 |
| HVA - 2 | — | 4.8 | — | — | — | — | — | — |
| MBTS | — | 1.2 | — | — | — | — | — | — |
| Zinc oxide | — | — | 3.0 | 1.2 | 1.2 | — | 3.0 | 1.2 |
| Stearic acid | — | — | 0.6 | 0.6 | 0.6 | — | 0.6 | 0.6 |
| Santocure ® accelerator | — | — | 3.0 | — | — | — | 3.0 | — |
| Sulfur | — | — | 0.9 | — | — | — | 0.9 | — |
| SP 1045 | — | — | — | 6.0 | — | — | — | — |
| SP 1056 | — | — | — | — | 6.0 | — | — | 6.0 |
| Stannous chloride | — | — | — | 0.6 | 0.6 | — | — | 0.6 |
| Properties | | | | | | | | |
| TS, MPa | 8.15 | 18.5 | 17.6 | 21.9 | 22.7 | 5.82 | 12.1 | 13.8 |
| M100, MPa | 5.81 | 14.4 | 11.8 | 16.1 | 16.1 | 5.02 | 8.16 | 10.3 |
| E, MPa | 53 | 76 | 69 | 88 | 89 | 45 | 60 | 56 |
| UE, % | 370 | 140 | 260 | 220 | 210 | 380 | 280 | 190 |
| Tension set, % | 53 | 25 | 19 | 21 | 20 | 64 | 27 | 25 |
| Shore D | 35 | 41 | 36 | 44 | 40 | 28 | 38 | 38 |
| Soluble rubber, Wt. % of | | | | | | | | |
| blend | 58.1 | 3.0 | 7.3 | 4.2 | 3.4 | 57.8 | 4.9 | 3.4 |
| rubber | 96.8 | 5.6 | 13.2 | 7.8 | 6.1 | 96.4 | 8.7 | 6.1 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 15 to about 95 parts by weight thermoplastic crystalline polyolefin resin and about 85 to about 5 parts by weight cross-linked polyalkenamer rubber per 100 total parts by weight polyolefin resin and polyalkenamer rubber, in which the polyalkenamer rubber is cross-linked to the extent that no more than fifty weight percent of the rubber is extractable in boiling xylene.

2. The composition of claim 1 in which the polyolefin resin is polyethylene or polypropylene.

3. The composition of claim 2 in which the rubber is polypentenamer rubber.

4. The composition of claim 3 in which the polypentenamer rubber is cross-linked to the extent that no more than twenty weight percent of the rubber is extractable in boiling xylene.

5. The composition of claim 4 comprising about 25 to about 75 parts by weight polyolefin resin and about 75 to about 25 parts by weight polypentenamer rubber.

6. The composition of claim 5 in which the polypentenamer rubber is in the form of dispersed particles of a size of 10 microns number average or less.

7. The composition of claim 6 in which the polyolefin resin is polyethylene.

8. The composition of claim 6 in which the polyolefin resin is polypropylene.

9. An elastoplastic composition comprising a blend of about 75 to 25 parts by weight thermoplastic crystalline polyolefin resin and about 25 to 75 parts by weight polyalkenamer rubber per 100 total parts by weight polyolefin resin and polyalkenamer rubber in which the polyalkenamer rubber is cross-linked to the extent that no more than twenty weight percent of the rubber is extractable in boiling xylene, which composition is elastomeric and processable as a thermoplastic.

10. The composition of claim 9 comprising a blend of about 30 to about 60 parts by weight polyolefin resin and about 70 to about 40 parts by weight of polyalkenamer rubber per 100 total parts by weight polyolefin resin and polyalkenamer rubber.

11. The composition of claim 10 in which the polyolefin resin is polyethylene or polypropylene.

12. The composition of claim 11 in which the rubber is polypentenamer rubber.

13. The composition of claim 12 in which the polypentenamer rubber is cross-linked to the extent that no more than ten weight percent of the rubber is extractable in boiling xylene.

14. The composition of claim 13 comprising about 30–50 parts by weight polyolefin resin and about 50–70 parts by weight polypentenamer rubber per 100 parts by weight and polyolefin resin and polypentenamer rubber combined.

15. The composition of claim 14 in which the polypentenamer rubber is in the form of dispersed particles of a size of 10 microns number average or less.

16. The composition of claim 15 in which the size of the dispersed cross-linked polypentenamer rubber particles is below 2 microns number average.

17. The composition of claim 16 in which the polyolefin resin is polyethylene.

18. The composition of claim 16 in which the polyolefin resin is polypropylene.

19. The composition of claim 17 prepared by masticating the blend with rubber curative at cross-linking temperature until the rubber is cross-linked.

20. The composition of claim 18 prepared by masticating the blend with rubber curative at cross-linking temperature until the rubber is cross-linked.

21. The composition of claim 18 in which the rubber is cross-linked with phenolic curing resin.

* * * * *